UNITED STATES PATENT OFFICE.

WILLIAM W. CARTER, OF NEEDHAM, MASSACHUSETTS, ASSIGNOR TO INDUSTRIAL AND RESEARCH LABORATORIES, OF BOSTON, MASSACHUSETTS, A CORPORATION OF MASSACHUSETTS.

FIBROUS MATERIAL.

1,365,891.        Specification of Letters Patent.        Patented Jan. 18, 1921.

No Drawing.      Application filed July 31, 1919. Serial No. 314,566.

*To all whom it may concern:*

Be it known that I, WILLIAM W. CARTER, a citizen of the United States, residing at Needham, county of Norfolk, State of Massachusetts, have invented a certain new and useful Improvement in Fibrous Materials, of which the following is a specification.

My invention has for its object a new and improved fibrous insulating material and the method of making it. The material embodying my invention is composed largely of fibrous material such as wood pulp together with oils or resins, natural or artificial gums or the like, and certain chemicals the nature and the purposes of which are fully explained herein. Heretofore, it has been customary to treat fiber board or paper with artificial or natural resinous gums, baking oils, varnishes and the like, and also attempts have been made to incorporate some of these materials into the paper during its manufacture by introducing the gum or other material during the process of beating. It has been recognized that the introduction of the gums and other materials with fibrous material while in the beater is advantageous, but great difficulty has been experienced in producing satisfactory results by this method of procedure and so far as I am aware, no one has ever succeeded in making commercially in this manner a product suitable for the uses herein described. My present invention consists in a new combination of materials which can be combined in the beater and a novel method which will produce a fibrous resinous material having high electrical insulating qualities, mechanical strength and resistance to moisture. The herein described material is capable of many uses, such for instance, as in the manufacture of trunks, bags, cases and the like, and as a leather substitute.

The invention will be understood from the following description, and the novel features thereof will be pointed out and clearly defined in the claims at the close of this specification.

The basis of my invention lies in the discovery that it is possible to mingle alkaline solutions of certain organic filling materials such as resins and oils, whether natural or artificial, with an alkaline solution of cellulose xanthate (thiocarbonate) without mutual interference and then to free the resins or oils from the alkaline solution by the use of a freeing agent such as an acid or an acid salt without effecting the cementing action of the cellulose xanthate on the basic fibers of the material. In this way, it is possible to produce a product containing fibers surrounded by and impregnated with very large quantities of the resinous, gummy or oily material in its natural state and held together by the adhesive effect of regenerated cellulose xanthate. This is done by making an alkaline solution of the organic filling material employed and an alkaline solution of cellulose xanthate and mixing the two in the beater with the fibrous material, after which the freeing agent or acid is added, which restores the resinous or gummy material to its original condition but does not regenerate the thiocarbonate. Thereafter, the mass is collected in some suitable way to form it into sheets or other suitable aggregations, after which the regeneration of the cellulose xanthate may be caused to take place in the usual way. The acid or acid salt to be employed must not have sufficient effect to decompose the xanthate, and in fact it must not be much stronger than acetic acid which has no effect on the xanthate. In place of the acid, other suitable materials can be used; for instance, sodium bisulfite works excellently and is perhaps the best material. Sulfurous acid ($H_2SO_3$) or sulfur dioxid ($SO_2$) may be employed. By the term organic filling material, I mean the resins and oils of the types herein mentioned.

I will now describe one practical application of my invention for the production of a typical product, as this will make the method of manufacture and the product entirely clear. A paper beater is charged with good hemp or Manila paper stock with a suitable filler of craft or wood pulp. Water is added in the proportion ordinarily employed in paper-making and the whole is beaten properly. I then add an alkaline gum solution in the proportion of 10 pounds of the pure gum to each 30 pounds of dry paper stock in the beater. The alkaline solution is made as follows:—Treat 10 pounds of the gum (this gum may be shellac or Manila copal, or both, in desired proportions) with $2\frac{1}{2}$ pounds twenty-six degree commercial ammonia and 50 pounds of water. This is allowed to stand for two hours and is then heated to 70° centigrade until dissolved, care being taken not to lose the ammonia by evaporation. The proper quantity of this alkaline gum solution is then placed in the beater. I then add a solution of sodium cellulose xanthate at the rate of one pound of dry xanthate to each 10 pounds of dry paper stock in the beater. As ordinary xanthate as prepared for artificial silk is soluble and is lost or washed out by the great excess of water in the paper machine, some means should be taken to prevent its loss. This can be done by using a specially prepared xanthate having the surface converted into xanthate or cellulose thiocarbonate but the center or core unconverted, such material being prepared in accordance with my pending application for United States Letters Patent, Serial No. 259,351, filing date Oct. 23, 1918, or by the use of a suitable mechanical method. The production of this xanthate can be effected by treating cellulose fibers with a suitable alkali in a quantity sufficient to convert the exterior layer of the fiber but insufficient to convert the entire fiber, care being taken that the alkali is so thoroughly distributed that no fibers are wholly converted. Thereafter the mass is treated with carbon bisulfid. The resulting fibers are in effect skeletonized since they retain a central core of unconverted fiber which is converted by a layer of xanthate which adheres to the skeleton, cannot be dissolved or washed off in water, and which until it is regenerated is very sticky. The beater is now run for half an hour to insure complete distribution of the materials. I then add a suitable freeing agent; for instance, bisulfite of soda. This is added in sufficient quantities to combine with the ammonia used with the shellac and with any uncombined alkali that may be contained in the xanthate. About 4 pounds of bisulfite of soda crystals are required for 10 pounds of gum dissolved by the use of 2½ pounds of twenty-six degree ammonia as stated above. A slight excess of bisulfite is not harmful.

The beater is then run for another half hour to make sure that the freeing agent has acted fully on the alkaline gum solution.

Thereafter, the mass may be formed by some suitable machine, as for instance, the ordinary "wet machine" or by the use of special machines which form thicker sheets, or into special forms such as blocks, boxes, pails and the like. The sheets thus obtained, after drying, may be molded in a hot hydraulic press and produce fine hard moisture-proof fiber articles having high insulating qualities and great tensile strength suitable for electrical work.

A great variety of gums, oils and resins, whether natural or artificial, may be employed. For instance, shellac, Manila copal, phenol resins condensation products, oxidizing oils and the like. The character of the final product is to a large extent determined by the nature of the gums or oils and their quantities and proportions which are employed. A large quantity of the harder gums increases the hardness and insulating qualities of the product while the oils tend to soften and render it more flexible.

I am aware that the resins and other gums have been introduced into paper, but they never have been combined with cellulose xanthate to produce the results described herein, and the proportion of phenol resin or other gum to the paper stock in the product embodying my invention is far greater than can be introduced in any other way.

What I claim is—

1. The improved product comprising fibrous material, an organic filling material freed from an alkaline solution by a freeing agent after the said solution was mixed with the fibrous material, the whole being held together by a cellulose xanthate regenerated after the filling material has been freed from the alkaline solution.

2. The process which consists in mingling an alkaline solution of an organic filling material and an alkaline cellulose xanthate solution and then freeing the said organic filling material.

3. The process which includes the commingling of an alkaline solution of an organic filling material with an alkaline cellulose xanthate and the freeing of the said organic filling material by the addition of a freeing agent having no action on cellulose xanthate.

4. The process which consists in mingling fibrous stock with water, adding an alkaline solution of an organic filling material and an alkaline solution of cellulose xanthate and then freeing the said organic filling material by the use of a freeing agent having no action on cellulose xanthate.

5. The process which consists in mingling fibrous stock with water, adding an alkaline solution of an organic filling material and an alkaline solution of cellulose xanthate and then freeing the said organic filling material by the use of a freeing agent having no action on cellulose xanthate, collecting the mass and then regenerating the cellulose xanthate.

6. The process which consists in the mixing of fibrous material and water in a paper beater, adding an alkaline solution of an organic filling material and an alkaline solution of cellulose xanthate, freeing the gum or oil by the use of sodium bisulfite, in quantity insufficient to regenerate the xanthate, collecting the mass, drying it and then regenerating the xanthate by the application of heat and pressure.

In testimony whereof I affix my signature.

WILLIAM W. CARTER.